(12) United States Patent
Enomoto

(10) Patent No.: US 11,475,688 B2
(45) Date of Patent: Oct. 18, 2022

(54) INFORMATION PROCESSING APPARATUS AND INFORMATION PROCESSING METHOD FOR EXTRACTING INFORMATION FROM DOCUMENT IMAGE

(71) Applicant: CANON KABUSHIKI KAISHA, Tokyo (JP)

(72) Inventor: Makoto Enomoto, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 17/011,391

(22) Filed: Sep. 3, 2020

(65) Prior Publication Data
US 2021/0073535 A1 Mar. 11, 2021

(30) Foreign Application Priority Data
Sep. 6, 2019 (JP) .............................. JP2019-162509

(51) Int. Cl.
*G06K 9/00* (2022.01)
*G06V 30/416* (2022.01)
*G06V 30/412* (2022.01)
*G06V 30/10* (2022.01)

(52) U.S. Cl.
CPC .......... *G06V 30/416* (2022.01); *G06V 30/412* (2022.01); *G06V 30/10* (2022.01)

(58) Field of Classification Search
CPC ..... G06V 30/416; G06V 30/10; G05V 30/412
See application file for complete search history.

(56) References Cited

U.S. PATENT DOCUMENTS

| 6,704,450 | B2 * | 3/2004 | Naoi | G06V 30/1444 715/228 |
| 7,801,392 | B2 * | 9/2010 | Koyama | G06V 10/7515 382/181 |
| 8,131,087 | B2 * | 3/2012 | Takebe | G06V 30/262 382/229 |
| 8,139,870 | B2 * | 3/2012 | Kato | G06V 10/768 382/229 |
| 8,891,871 | B2 | 11/2014 | Eguchi | |
| 10,984,285 | B2 * | 4/2021 | Yoshizuka | G06K 9/6201 |
| 2021/0073535 | A1 * | 3/2021 | Enomoto | G06V 30/416 |

FOREIGN PATENT DOCUMENTS

JP 2010003155 A 1/2010

* cited by examiner

*Primary Examiner* — Gregory M Desire
(74) *Attorney, Agent, or Firm* — Rossi, Kimms & McDowell LLP

(57) ABSTRACT

According to a form of the present disclosure, character strings are obtained from a document image by performing an optical character recognition process on the document image, whether each of the obtained character strings is an item name or an item value is evaluated, character strings determined to be the item names and continuously present in a horizontal or vertical direction are grouped as one item name group, a search region is set by combining the one item name group and a region where one or more character strings each determined to be the item value and adjacent to the item name group are continuously present, and the item value is extracted based on the relationship between the item name and the item value for each of the search regions.

5 Claims, 16 Drawing Sheets

Invoice

Bill to : Cxxxn          Issuer : PC Shop

Issue Date : 2019/5/1

— 302

| Commodity Name | Quantity | Unit Price | Subtotal |
| --- | --- | --- | --- |
| PC | 1 | 100,000 | 100,000 |
| Keyboard | 1 | 1,000 | 1,000 |
| Mouse | 1 | 2,000 | 2,000 |
| | | Subtotal | 103,000 |
| | | Tax | 10,300 |
| | | Total | 113,300 |

— 303

| ITEM NAME PATTERN | ITEM VALUE PATTERN |
|---|---|
| invoice.* | \d{1,4}[\-\.]\d{1,2}[\-\.]\d{1,4} |
| issue.* | \$?[0-9\.,]*\$? |
| commodity.* | \d{3}[\-\(,\./]?\d{3}[\)\-,\.]?\d{4} |
| quantity.* | |
| .*unit price | |
| .*price.* | |
| .*total | |
| tax.* | |

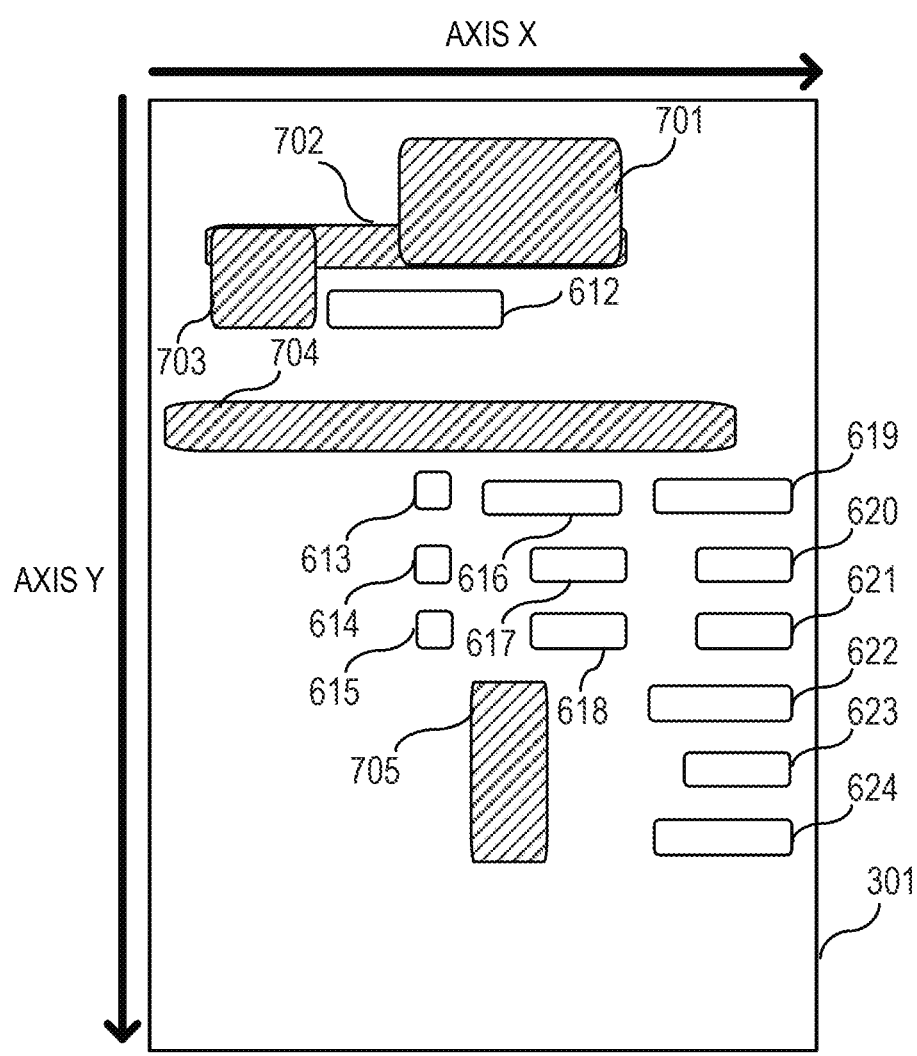

FIG. 9

| Invoice | | | |
|---|---|---|---|
| Bill to : Cxxxn | | Issuer : PC Shop | |
| Issue Date : 2019/5/1 | | | |

— 901

| Commodity Name | Quantity | Unit Price | Subtotal |
|---|---|---|---|
| PC | 1 | 100,000 | 100,000 |
| Keyboard | 1 | 1,000 | 1,000 |
| Mouse | 1 | 2,000 | 2,000 |

— 902

| | | Subtotal | 103,000 |
|---|---|---|---|
| | | Tax | 10,300 |
| | | Total | 113,300 |

| LABEL | SEARCH TYPE | DEFINITION |
|---|---|---|
| PAYMENT | ITEM SEARCH (REGULAR EXPRESSION) | \$?[0-9\.,]*\$? |
| SUBTOTAL ITEM NAME | ITEM SEARCH (DICTIONARY) | ["subtotal", "price"] |
| TOTAL ITEM NAME | ITEM SEARCH (DICTIONARY) | ["total", "taxtotal", "amount"] |
| COMMODITY SUBTOTAL ITEM VALUE | POSITIONAL RELATIONSHIP (BELOW) | ITEM NAME: "subtotal item name", ITEM VALUE: "payment" |
| SUBTOTAL ITEM VALUE | POSITIONAL RELATIONSHIP (RIGHT) | ITEM NAME: "subtotal item name", ITEM VALUE: "payment" |
| PAYMENT ITEM VALUE | POSITIONAL RELATIONSHIP (RIGHT) | ITEM NAME: "total item name", ITEM VALUE: "payment" |

FIG. 14A

Invoice

| Issue Date : 2019/5/1 | | | |
|---|---|---|---|
| Bill to | | Issuer | |
| Cxxxn<br>TEL 0xx - zzz - yyyy | | PC Store<br>TEL 0xx - yyy - zzzz | |
| Commodity Name | Quantity | Unit Price | Subtotal |
| PC | 1 | 100,000 | 100,000 |
| Keyboard | 1 | 1,000 | 1,000 |
| Mouse | 1 | 2,000 | 2,000 |
| | | Subtotal | 103,000 |
| | | Tax | 10,300 |
| | | Total | 113,300 |

Invoice

| Issue Date | | | |
|---|---|---|---|
| Bill to | | Issuer | |
| Cxxxn<br>TEL 0xx - zzz - yyyy | | PC Store<br>TEL 0xx - yyy - zzzz | |
| Commodity Name | Quantity | Unit Price | Subtotal |
| PC | 1 | 100,000 | 100,000 |
| Keyboard | 1 | 1,000 | 1,000 |
| Mouse | 1 | 2,000 | 2,000 |
| | | Subtotal | 103,000 |
| | | Tax | 10,300 |
| | | Total | 113,300 |

INFORMATION PROCESSING APPARATUS AND INFORMATION PROCESSING METHOD FOR EXTRACTING INFORMATION FROM DOCUMENT IMAGE

BACKGROUND

Field

The present disclosure relates to an information processing apparatus and an information processing method for extracting necessary information from a document image and further relates to a non-transitory storage medium.

Description of the Related Art

There has been a ledger sheet recognition technology for necessary information extraction from a document image read, for example, with a scanner, by defining the content of a specific ledger sheet in advance, identifying the type of a ledger sheet based on the layout characteristic of the document image, and recognizing a character in a predetermined position in the image. However, the format of a document, such as an invoice, has not been stylized because the issuer of the document can arbitrarily set the format, and it is therefore difficult to define the format in advance.

As a related-art technology for solving the problem described above, there is a method for searching for character strings corresponding to an item name and an item value and extracting information based on the relationship between the item name and the item value. In this method, for example, a character string including a numeral adjacent to a character string showing an item name "date" is extracted as the item value. The method, however, has a difficulty in defining the relationship in the case of a complicated layout, such as the details of an invoice.

Japanese Patent Application Laid-Open No. 2010-003155 has been proposed as a technology for extraction of information from a complicated layout. Japanese Patent Application Laid-Open No. 2010-003155 employs a method for analyzing a table structure of a table region in a document image and imparting an attribute to the content of a table cell based, for example, on a character string corresponding to the header of the table.

The technology described in Japanese Patent Application Laid-Open No. 2010-003155, however, requires a table structure and cannot handle a case where a document has no table structure. There has therefore been a desire to handle a document image having a complicated layout based on extraction using an item name and an item value including a case where no table structure is present.

SUMMARY

One aspect of the present disclosure is directed to an information processing apparatus that is characterized by comprising: at least one memory that stores a program; and at least one processor that executes the program to perform: obtaining character strings by performing an optical character recognition process on a document image; evaluating whether each of the obtained character strings is an item name or an item value; grouping, as one item name group, one or more character strings each determined to be the item name and continuously present in a horizontal or vertical direction in the document image; setting one or more search regions in the document image, wherein the set one or more search regions are each formed of the one item name group and a region where one or more character strings each determined to be the item value and adjacent to the one item name group are continuously present; and extracting the item value based on a relationship between the item name and the item value for each of the search regions.

Further features of the present disclosure will become apparent from the following description of exemplary embodiments with reference to the attached drawings.

BRIEF DESCRIPTION OF THE DRAWINGS

FIG. 3 illustrates an example of a scanned image.

FIG. 7 illustrates the result of grouping according to the first embodiment.

FIG. 9 illustrates the result of the search region division according to the first embodiment.

FIG. 11 illustrates extraction rules according to the first embodiment.

FIGS. 14A and 14B illustrate the result of the search region extraction according to the second embodiment.

FIGS. 16A and 16B illustrate the course of the search region extraction according to the third embodiment.

DESCRIPTION OF THE EMBODIMENTS

First Embodiment

Figure 1:
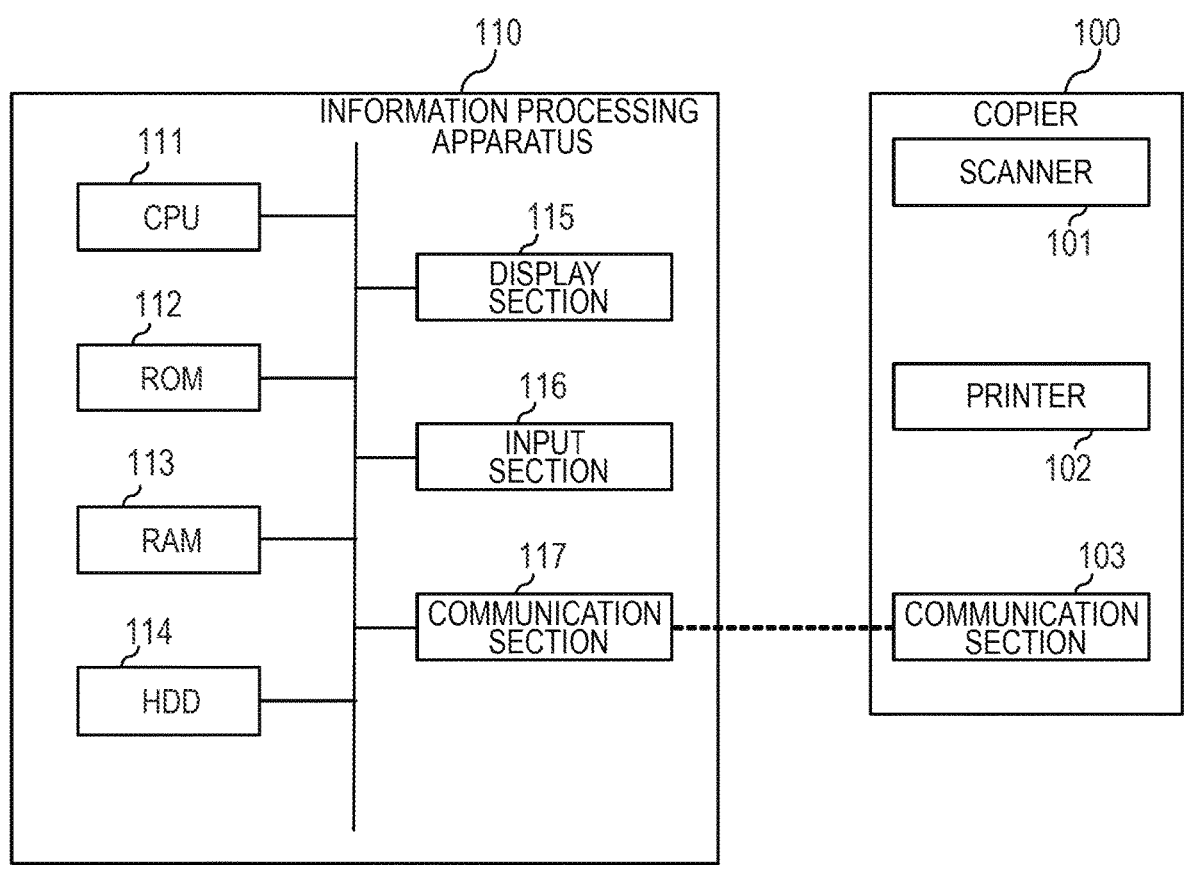
FIG. 1 illustrates an information processing system according to a first embodiment.

FIG. 1 illustrates an example of the configuration of an information processing system in which an information processing apparatus representing an embodiment of the present disclosure can be used.

The information processing system according to the present embodiment includes a copier 100 and an information processing apparatus 110. The copier 100 is a multifunction peripheral (MFP) including a scanner 101, a printer 102, and a communication section 103.

In the copier 100, the scanner 101 scans a document to produce a scanned image. The printer 102 forms the image, for example, on a sheet. The communication section 103 communicates with an external apparatus (information processing apparatus 110, for example) over a network.

The information processing apparatus 110 includes a CPU 111, a ROM 112, a RAM 113, an HDD 114, a display section 115, an input section 116, a communication section 117, and other sections. The information processing apparatus 110 is, for example, configured by a personal computer (PC).

The CPU 111 reads a control program stored in the ROM 112 to carry out a variety of processes. The RAM 113 is used as a temporary storage region, such as a primary memory and a work area of the CPU 111. The HDD 114 stores a variety of data, a variety of programs, and other pieces of information. In place of or in addition to the HDD (hard disk drive), another storage apparatus, such as SDD (solid state drive), may be provided.

The functions provided by the information processing apparatus 110 and the processes carried out by the information processing apparatus 110, which will be described later, are each achieved when the CPU 111 reads a program stored, for example, in one of the ROM 112 and the HDD 114 and executes the program.

The communication section 117 communicates with an external apparatus (copier 100, for example) over a network. The display section 115 displays a variety of pieces of information. The input section 116 includes a keyboard and a mouse and accepts a variety of types of user's operation. The display section 115 and the input section 116 may be integrated into, for example, a touch panel. The display section 115 may project a variety of pieces of information via a projector, and the input section 116 may recognize with a camera the position of a fingertip that points at a projected image.

In the present embodiment, the scanner 101 of the copier 100 scans a document, such as a sales slip, to produce an input image (such as scanned image 301 in FIG. 3, for example). The input image is transmitted to the information processing apparatus 110 via the communication section 103.

The information processing apparatus 110 receives the input image transmitted from the copier 100 via the communication section 117 and memories the received input image in a storage, such as the HDD 114.

Figure 2:
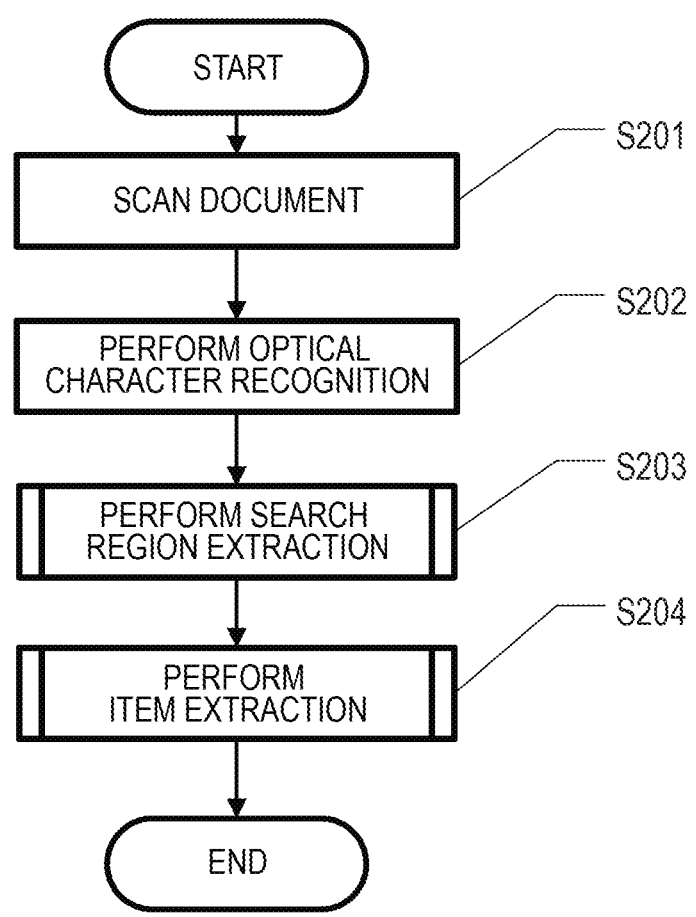
FIG. 2 is a flowchart illustrating extraction according to the first embodiment.

FIG. 2 is a flowchart illustrating an example of information extraction according to the present embodiment. The processes in the flowcharts illustrated in FIG. 2 and FIGS. 4, 8, and 10, which will be described later, are each achieved when the CPU 111 of the information processing apparatus 110 reads a program stored, for example, in one of the ROM 112 and the HDD 114 and executes the program.

In S201, the CPU 111 of the information processing apparatus 110 instructs the copier 100 to cause the scanner 101 to scan a document. The CPU 111 then acquires the scanned image read in the scan process via the communication section 117 and stores the acquired scanned image in the HDD 114. The scanner 101 may scan a document in response to an instruction from an operation section that is not shown but is part of the copier 100 and transmit the scanned image to the information processing apparatus 110 in push transmission.

FIG. 3 illustrates an example of the scanned image of a document.

A scanned image 301 is, for example, an image that is a scanned invoice.

The scanned image 301 shows, for example, the name of a company having issued the invoice and the date when the invoice was issued and further shows the unit price and the subtotal on a commodity basis, the calculated subtotal of the commodities, the total payment, and other pieces of information.

In the present embodiment, the process of extracting the values described above will be described. Further, in the present embodiment, an image of an invoice is used as the document, and another document other than an invoice may be used.

The description of the flowchart of FIG. 2 will resume below.

In S202, the CPU 111 then performs optical character recognition (OCR) process on the scanned image 301 and stores character candidate information on candidates of each character provided by the optical character recognition in the RAM 113. The CPU 111 further obtains character string information based on the obtained character candidate information described above. The optical character recognition is a process carried out by the CPU 111 and the process of identifying a character region from a document image containing characters, calculating a feature quantity of each character image in the character region, comparing the feature quantity with a character recognition dictionary, and calculating one or more character candidates similar to one another. The process of obtaining character string information based on the character candidate information is a process carried out by the CPU 111 and the process of concatenating character string candidates corresponding to adjacent characters to form a character string and configuring single-image character string information from a plurality of character strings. Each character string may be the combination of character units that make sense. Further, character strings may be combined with each other, or a character string may be separated into smaller parts by using morpheme analysis, a regular expression pattern, a dictionary, and other tools. In the present embodiment, a character includes a numeral and a symbol.

In S203, the CPU 111 then extracts a plurality of regions for search purposes from the character string information obtained in S202 described above (search region extraction). The search region extraction will be described below in detail with reference to FIG. 4.

Figure 4:
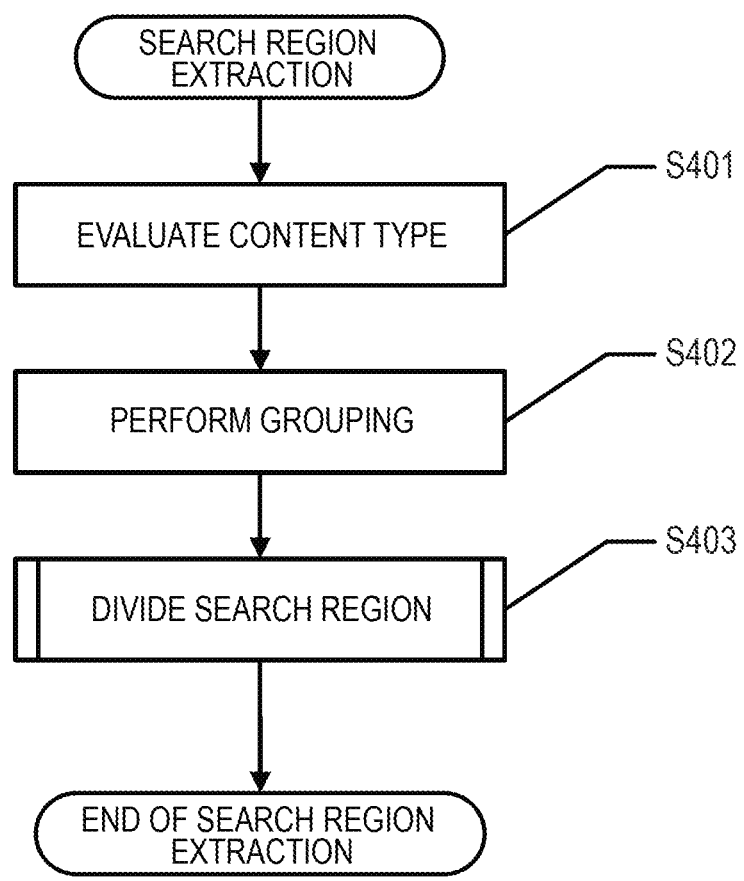
FIG. 4 is a flowchart illustrating search region extraction according to the first embodiment.

FIG. 4 is a flowchart illustrating an example of the details of the search region extraction in S203 in FIG. 2 in the first embodiment.

In S401, the CPU 111 performs content type evaluation that is the process of evaluating whether a character string is an item name representing the type/attribute of the item or an item value representing the value of the item based on the character string information provided in S202 in FIG. 2. The content type evaluation is performed, for example, by using a regular expression pattern. The content type evaluation will be described with reference to FIG. 5.

Figure 5:
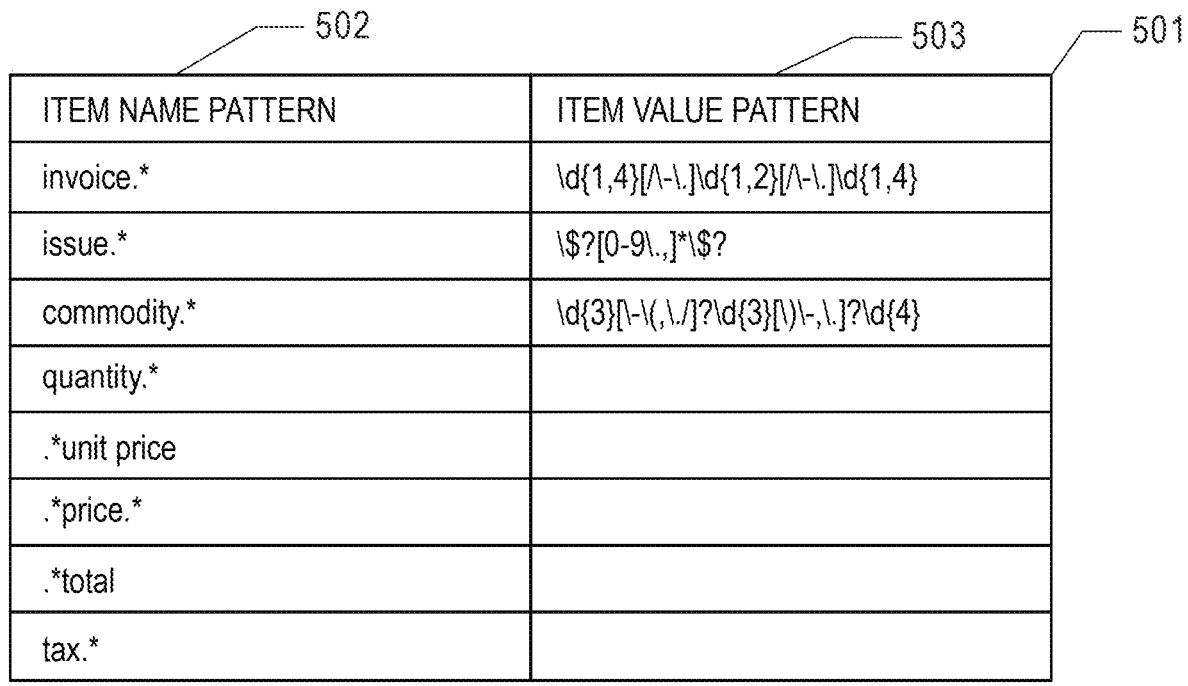
FIG. 5 illustrates a content type evaluation pattern according to the first embodiment.

FIG. 5 illustrates an example of a regular expression pattern group for content type evaluation.

A table 501 has an item name pattern column 502 and an item value pattern column 503.

The item name pattern column 502 stores a regular expression formula used to evaluate the item name. The item value pattern column 503 stores a regular expression formula used to evaluate the item value.

The item name pattern column 502 shows, for example, a regular expression formula "invoice.*", and character strings "invoice" and "Bill to" match the pattern and are each determined as an item name.

The item value pattern column 503 shows, for example, a regular expression formula "\d{1,4}[/\-\.]\d{1,2}[/\-\.]\d{1,4}". The regular expression formula shows a character string pattern in which one-digit to four-digit numerals, one-digit or two-digit numerals, and one-digit to four-digit numerals are separated by symbols "/", "-" and ".". For example, the character string "2019/5/1" matches the pattern and is determined as the item value. The present approach is presented by way of example. For example, a dictionary may be used, and the determination may be made by evaluating whether the character string matches the dictionary. In addition to the above, to correct false OCR recognition, instead, a plurality of candidates recognized by OCR may be used, or a confusion matrix representing a false recognition tendency may be used. Still instead, a known dynamic programming (DP) matching approach may be used to search for candidates based on ambiguous matching. In the present embodiment, the content type evaluation has been described with reference only to an item necessary for an invoice, and the description is made based on general-purpose vocabulary independent of special ledger sheet vocabulary.

Figure 6A:
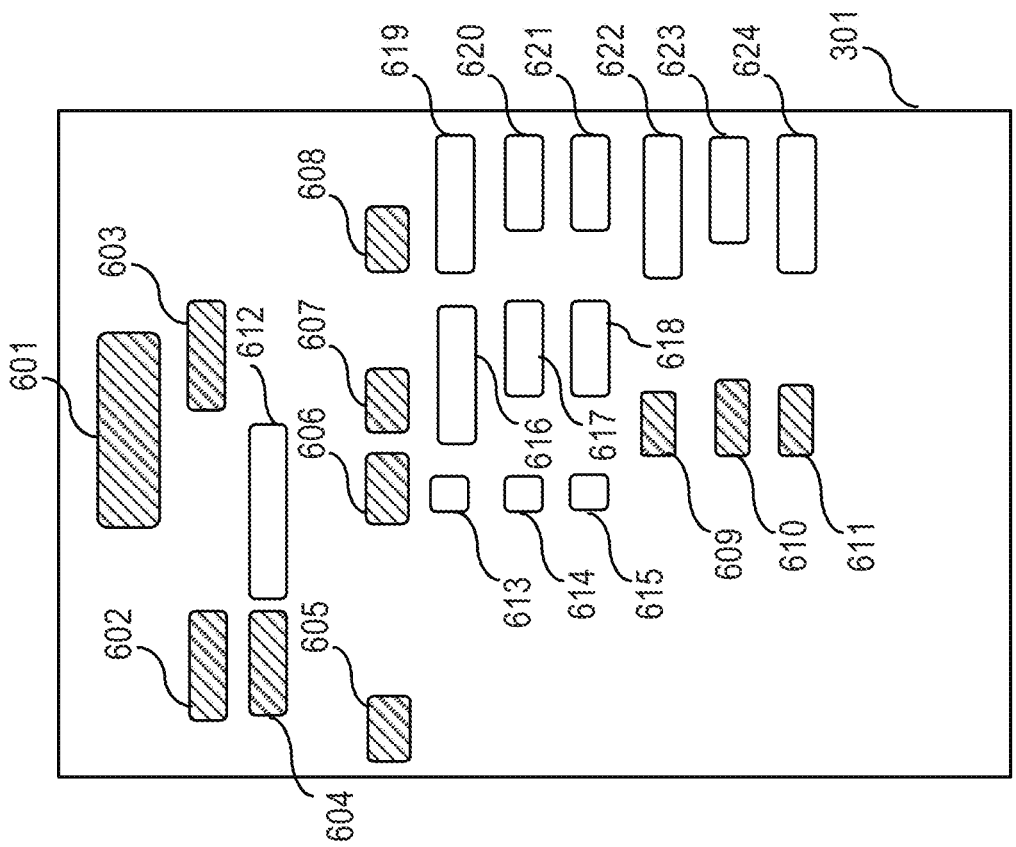
FIGS. 6A and 6B illustrate the result of the content type evaluation according to the first embodiment.
Figure 6B:
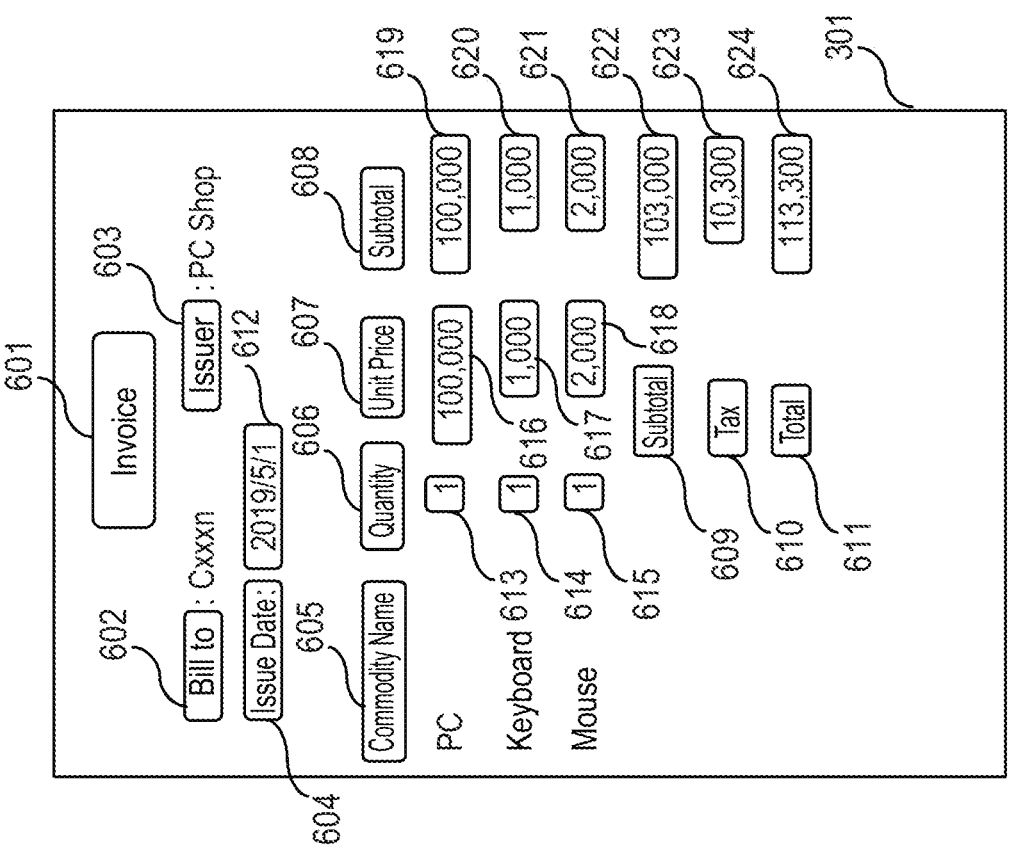

FIGS. 6A and 6B illustrate an example of the result of the content type evaluation in S401 in FIG. 4.

FIG. 6A illustrates a case where the regular expression formula group 501 is applied to character string information in the scanned image 301 and corresponds to the result of the content type evaluation.

A character string 601 is an "invoice," and the content type has been determined as an item name, as described above. Similarly, character strings 602 to 611 have each been determined as an item name. Character strings 612 to 624 have each been determined as an item value.

FIG. 6B illustrates a case where the character strings in FIG. 6A are made invisible and the character strings 601 to 611 each determined that the content type is an item name are each expressed in the form of an obliquely hatched rectangle for explanation purposes.

The description of the flowchart of FIG. 4 will resume below.

In S402, the CPU 111 then creates an item name group (grouping) based on the content type information provided in S401 described above.

In the present embodiment, the grouping is the process of horizontally or vertically concatenating adjacent item name character strings continuously in terms of image coordinates, that is, with no item value therebetween to create an item name row or an item name column. The process will be described with reference to FIG. 7.

FIG. 7 illustrates an example of the result of the grouping in S402 in FIG. 4.

Numeral 701 represents an item name column formed of the item name character strings 601 and 603 concatenated with each other in the vertical direction.

Numeral 702 represents an item name row formed of the item name character strings 602 and 603 concatenated with each other in the horizontal direction.

Numeral 703 represents an item name column formed of the character strings 602 and 604 concatenated with each other in the vertical direction.

Numeral 704 represents an item name row formed of the item name character strings 605 to 608 concatenated with each other in the horizontal direction.

Numeral 705 represents an item name row formed of the item name character strings 609 to 611 concatenated with each other in the vertical direction.

As described above, in the grouping, when one or more character strings each determined as an item name are continuously arranged in the horizontal or vertical direction in a document image, an item name group, such as an item name row and an item name column, is created.

In the present embodiment, the horizontal direction in an image is called an axis X, the vertical direction in the image is called an axis Y, and the upper left corner of the image is called an origin.

The description of the flowchart of FIG. 4 will resume below.

In S403, the CPU 111 then divides the search region. In the search region division (S403) in the present embodiment, the entire image in the initial state is divided into a plurality of search regions by using the result of the grouping in S402. In the present embodiment, item name groups are processed sequentially from above in terms of coordinate Y to divide the item name groups by using at least one item name group and at least one item value character string as one search region unit. A specific example of the process will be described with reference to the flowchart of FIG. 8.

Figure 8:
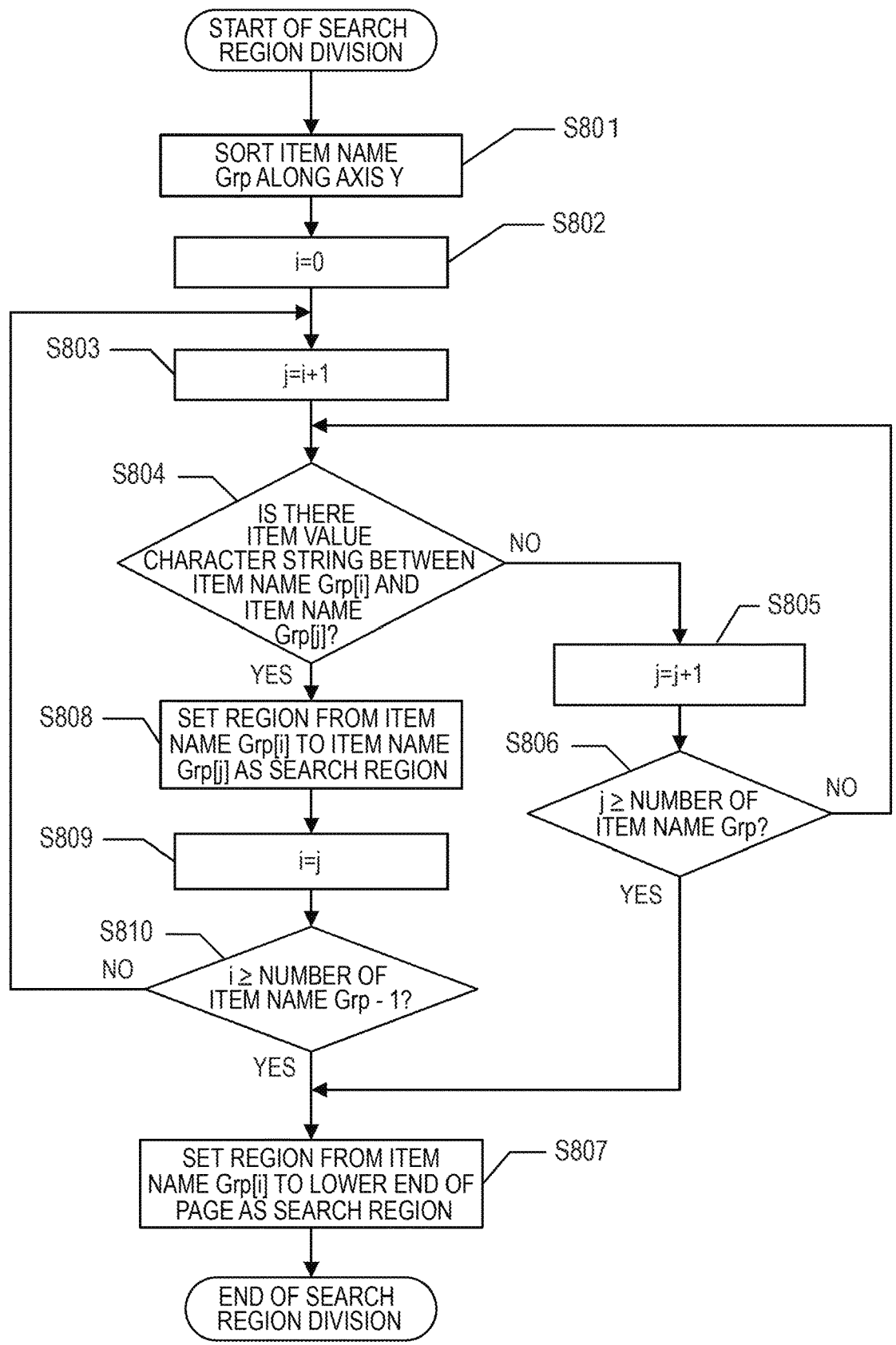
FIG. 8 is a flowchart illustrating a search region division according to the first embodiment.

FIG. 8 is a flowchart illustrating an example of the details of the search region division in S403 in FIG. 4.

In S801, the CPU 111 sorts the item name groups in descending order of the coordinate Y of the upper end of the circumscribed rectangle. The upper end of the circumscribed rectangle of an item name group is hereinafter simply defined as the upper end of the item name group.

In S802, the CPU 111 sets a variable i at zero, the variable i representing a first item name group to be processed.

In S803, the CPU 111 sets a variable j at i+1 (j=i+1), the variable j representing a second item name group present below the first item name group to be processed.

In S804, the CPU 111 evaluates whether or not there is an item value character string having a value of a coordinate Y between the coordinate Y of the upper end of the i-th item name group and the coordinate Y of the upper end of the j-th item name group. When there is no such a Y-coordinate (No in S804), the CPU 111 proceeds to the process in S805.

In S805, the CPU 111 adds 1 to the variable j.

In S806, the CPU 111 then evaluates whether or not the j-th item name group is present in the item name groups. When the j-th item name group is present in the item name groups, that is, the maximum number of item name groups has not been reached (No in S806), the CPU 111 returns to the process in S804.

On the other hand, when the j-th item name group is not present in the item name groups, that is, the maximum number of item name groups has been reached (Yes in S806), the CPU 111 proceeds to the process in S807. The process in S807 will be described later.

In S804 described above, when there is an item value character string having a value of a coordinate Y between the coordinate Y of the upper end of the i-th item name group and the coordinate Y of the upper end of the j-th item name group (Yes in S804), the CPU 111 proceeds to the process in S808.

In S808, the CPU 111 sets the region from the coordinate Y of the upper end of the i-th item name group and the coordinate Y of the upper end of the j-th item name group as one search region.

In S809, the CPU 111 then substitutes the value j into the variable i (i=j).

In S810, the CPU 111 then evaluates whether or not the i-th item name group is next to the last item name group or beyond. When the i-th item name group is not next to the last item name group or beyond (No in S810), the CPU 111 returns to the process in S803.

On the other hand, when the i-th item name group is next to the last item name group or beyond (Yes in S810), the CPU 111 proceeds to the process in S807.

In S807, the CPU 111 sets the region from the i-th item name group to the lower-end of the page as a search region and terminates the processes of the present flowchart.

The result of the search region division in S403 will be described with reference to FIG. 9.

FIG. 9 illustrates an example of the result of the search region division in S403 in FIG. 4.

A search region 901 is a search region divided from the scanned image 301 that is the search region between the upper end of the item name group 701 and the upper end of the item name group 704.

A search region 902 is a search region divided from the scanned image 301 that is the search region between the upper end of the item name group 704 and the upper end of the item name group 705.

A search region 903 is a search region divided from the scanned image 301 that is the search region between the upper end of the item name group 705 and the lower end of the page.

As described above, a region where one or more groups are continuously present in a document image and a region which is adjacent to the region and where there are character strings determined to be one or more item values are combined with each other into one search region, and one or more search regions are set in the document image. A search range from which a rule defined item value, such as a date, a telephone number, and a price, is extracted from the document image can be specified.

The search region dividing method described in the present embodiment is presented by way of example. Instead, the coordinate Y may be replaced with the coordinate X and vice versa, and the process of dividing a scanned image into search regions from the left end of the scanned image along the coordinate X may be added.

The description of the flowchart of FIG. 4 will resume below.

When the search region division in S403 in FIG. 4 is completed, the CPU 111 terminates the search region extraction in FIG. 4 (S203 in FIG. 2) and proceeds to the process in S204 in FIG. 2.

The description of the flowchart of FIG. 2 will resume below.

In S204, the CPU 111 uses a rule according to the type of ledger sheet to extract an item on a search region basis. The item extraction is the process of extracting a specific value according to a defined rule. The item extraction will be described below in detail with reference to FIG. 10.

Figure 10:
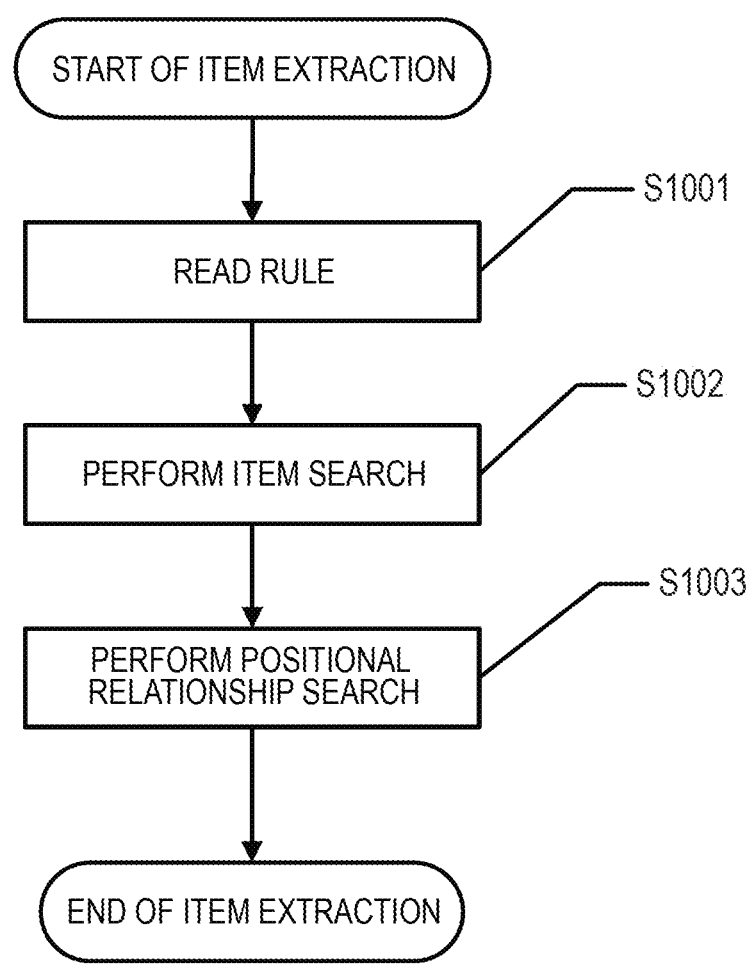
FIG. 10 is a flowchart illustrating item extraction according to the first embodiment.

FIG. 10 is a flowchart illustrating an example of the details of the item extraction in S204 in FIG. 2. In S1001, the CPU 111 reads an extraction rule on a ledger sheet type basis. The item extraction will be described below with reference to FIG. 11.

FIG. 11 illustrates an example of extraction rules for a receipt in the present embodiment. It is assumed that the extraction rules are stored, for example, in the HDD 114 in advance.

A table 1101 is a simplified table for describing the contents of definition of the extraction rules.

A label column 1102 defines the names of search contents.

A search type column 1103 defines search methods.

A definition column 1104 defines definition values on a search method basis.

A payment label 1105 defines search for a numeral string including a numeral, a comma, and a dot and a symbol "$", if any, in front of or behind the numeral string by using a regular expression.

A subtotal item name label 1106 defines search for a character string that coincides with "subtotal" or "price" based on dictionary search.

A total item name label 1107 defines search for a character string that coincides with "total," "taxtotal," or "amount" based on dictionary search.

A commodity subtotal item value 1108 defines search for the "payment" label present below the "subtotal item name" label based on search using the positional relationship.

A subtotal item value 1109 defines search for the "payment" label present on the right of the "subtotal item name" label based on search using the positional relationship.

A total item value 1110 defines search for the "payment" label present on the right of the "total item name" label based on search using the positional relationship.

The description of the flowchart of FIG. 10 will resume below.

In S1002, the CPU 111 uses a dictionary or a regular expression to perform item search on the character strings recognized in S202 in FIG. 2 according to the extraction rule acquired in S1001 described above.

In S1003, the CPU 111 searches for the items acquired in S1002 described above based on the positional relationship for each of the search regions divided in S403 in FIG. 4.

Figure 12:
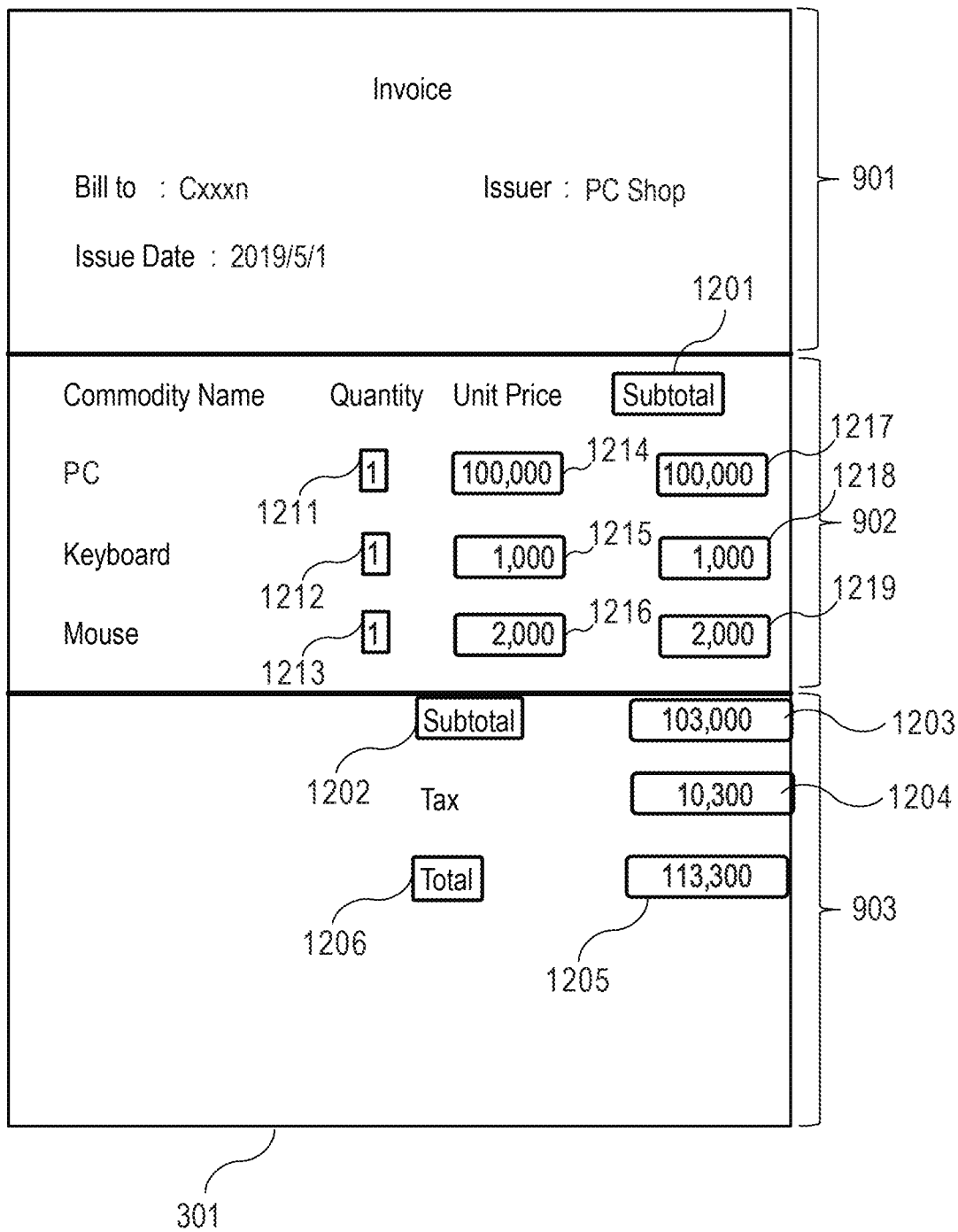
FIG. 12 illustrates the course of the item extraction according to the first embodiment.

FIG. 12 illustrates the items acquired in S1002 in the scanned image 301.

In S1002 in FIG. 10, character strings 1201 and 1202 are searched for as the "subtotal item name." A character string 1206 is searched for as the "total item name." Character strings 1211 to 1213, 1214 to 1216, 1217 to 1219, and 1203 to 1205 are searched for as the "payment."

In the positional relationship search over the range of the search region 902 in S1003 in FIG. 10, the payment character strings 1217 to 1219 are present at coordinates below the subtotal item name character string 1201 (positional relationship (below)) and are each therefore searched for as the "commodity subtotal item value." In the positional relationship search over the range of the search region 903, the payment character string 1203 is present at a coordinate on the right of the subtotal item name character string 1202 (positional relationship (right)) and is therefore searched for as the "subtotal item value." Further, the payment character string 1205 is present at a coordinate on the right of the total item name character string 1206 (positional relationship (right)) and is therefore searched for as the "total item value."

When the search region division described in the present embodiment is not performed, that is, when the positional relationship search is performed on the entire image, the payment character string 1203, which is located below the subtotal item name character string 1201, is undesirably searched for also as the "commodity subtotal item value." Similarly, the payment character strings 1204 and 1205 are also each falsely searched for as the commodity subtotal item value. To ensure that the payment character strings 1203, 1204 and 1205 are not falsely searched for, it is necessary to set search restriction, for example, select a shorter distance between the item name and the item value in the search of the "commodity subtotal item value" and the "subtotal item value."

However, for example, in the case where the position of the subtotal item name character string 1202 is located on the left, setting the search restriction described above still allows a situation in which the distance from the payment character string 1203 to the subtotal item name character string 1202 is longer than the distance from the payment character string 1203. In this case, the payment character string 1203 is falsely searched for as the commodity subtotal item value, resulting in search failure. In addition, in a case where the commodity unit price item value located below the unit price item name is located on the left, it is conceivable to search for the payment character string 1203 as the commodity subtotal item value. In this method, however, a variety of cases are conceivable, and rule description becomes very complicated.

The extraction rule table 1101 described in the present embodiment is an example for describing the present embodiment, and the contents of definition of the extraction rules are not limited to the table 1101. For example, in the case of "subtotal," the vocabulary corresponding to the subtotal may be expanded according to the use case, and a variety of restrictions and other conditions may be set for further improvement in search accuracy. As described above, in the item extraction (FIG. 10) in S204 in FIG. 2, it is desirable to allow customization according to the type of ledger sheet or the use case.

In the search region extraction (FIG. 4) in S203 in FIG. 2 described in the present embodiment, correction, addition, and expansion of a rule for the item extraction can be simplified by a simple process that does not depend on the use case but uses a general-purpose vocabulary or pattern.

As described above, dividing a document image into appropriate regions readily allows definition of item value extraction rules. Further, dividing a search region before the item extraction allows accurate item extraction based on the simple rule definition. Therefore, even in the case of a document image having a complicated layout, the positional relationship between an item name and an item value allows appropriate extraction of the item value irrespective of presence or absence of a table structure.

Second Embodiment

The description of a second embodiment will be made only of the difference from the first embodiment described above, and it is assumed that portions that are not specifically described explicitly have the same configuration/procedure as the configuration/procedure in the first embodiment.

In the first embodiment described above, a search region is extracted using only the result of the optical character recognition, whereas the frame of a table may be extracted as a search region in the second embodiment.

Figure 13:
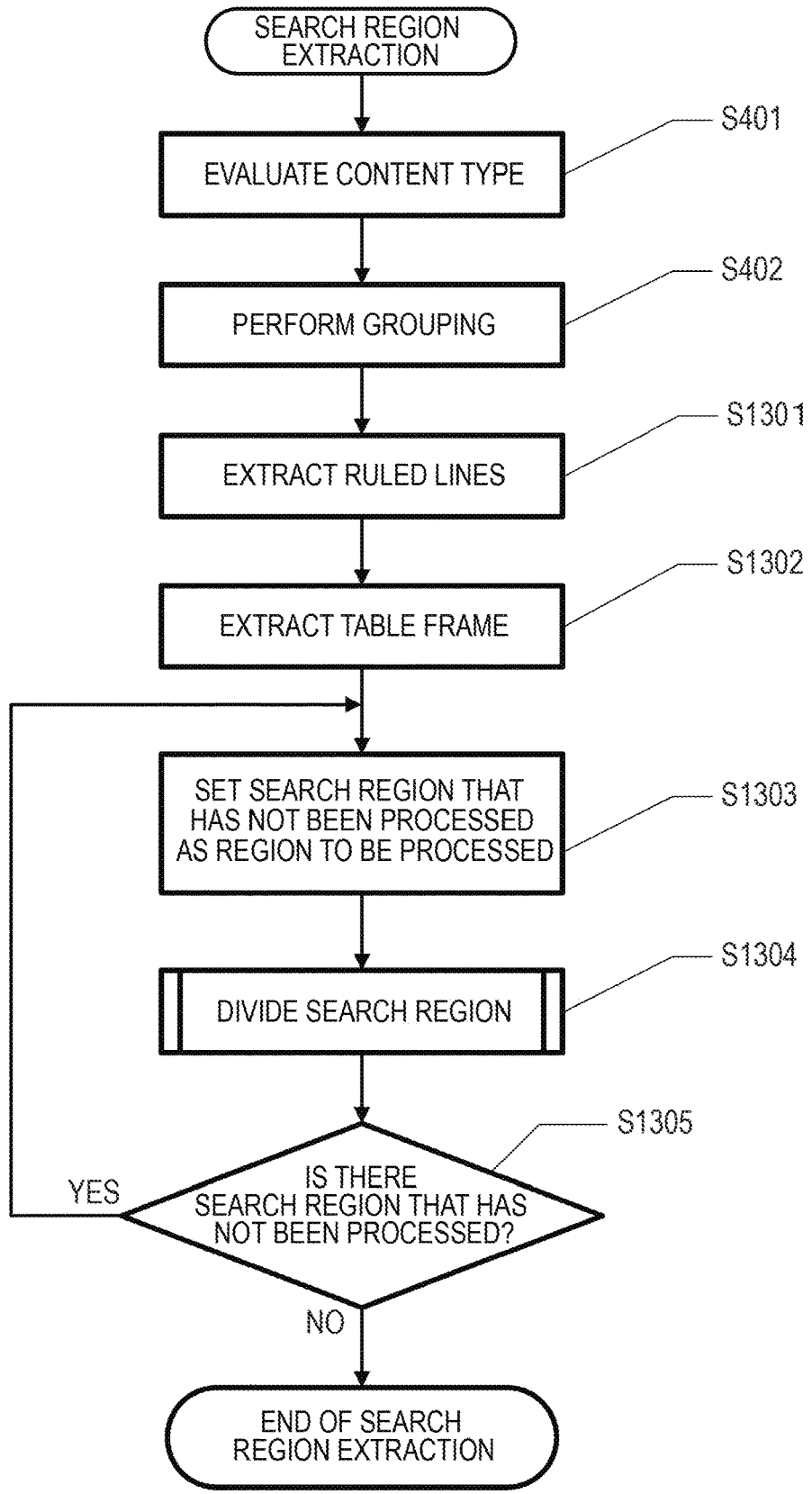
FIG. 13 is a flowchart illustrating the search region extraction according to a second embodiment.
Figure 15:
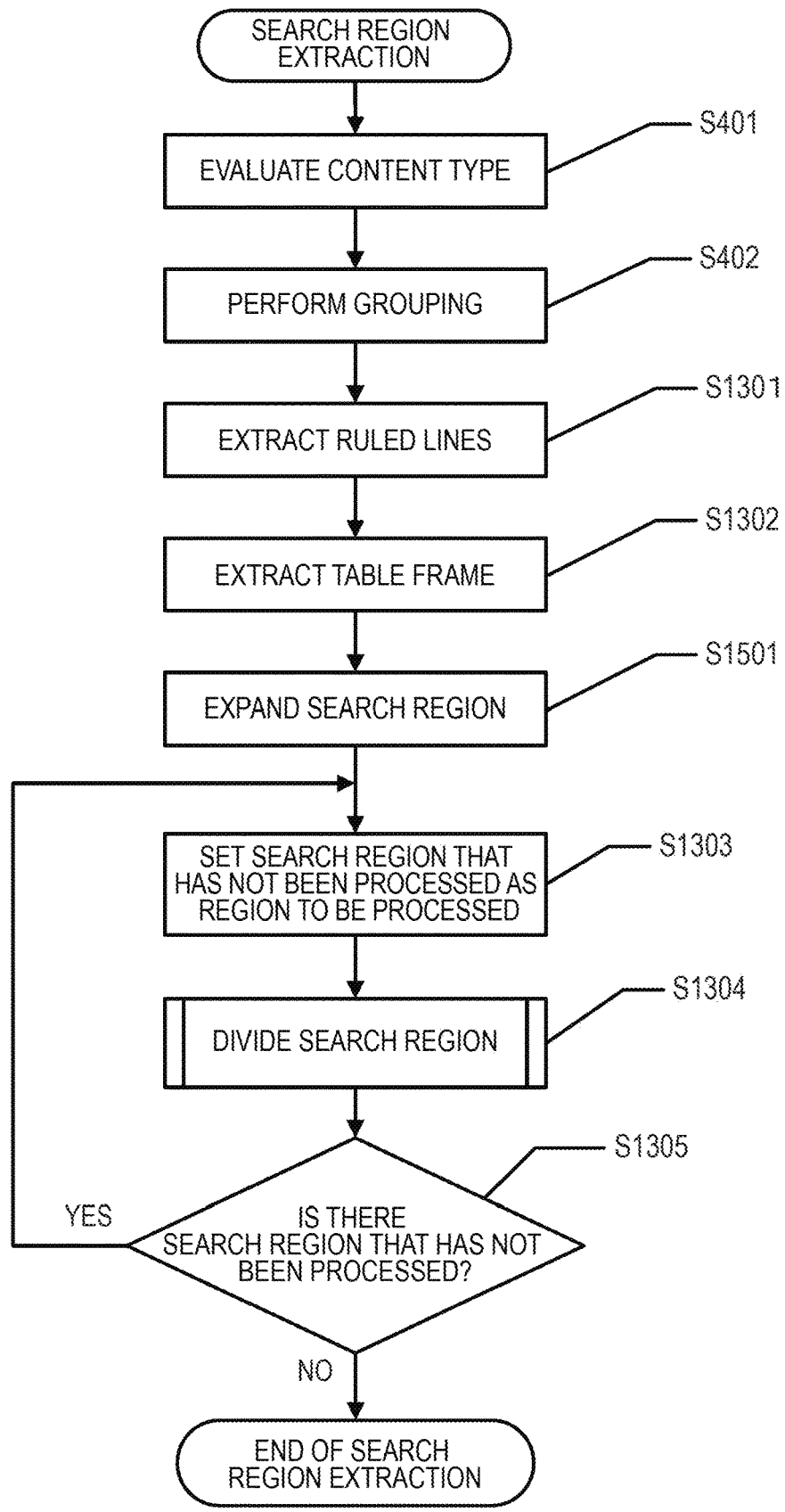
FIG. 15 is a flowchart illustrating the item extraction according to a third embodiment.

FIG. 13 is a flowchart illustrating an example of the details of the search region extraction in S203 in FIG. 2 in the second embodiment. The contents of the processes in S401 and 5402 are the same as the contents in the flowchart of FIG. 4 in the first embodiment and are therefore not be described. The processes in the flowchart illustrated in FIG. 15 are achieved when the CPU 111 of the information processing apparatus 110 reads and executes a program stored, for example, in one of the ROM 112 and the HDD 114.

In S1301, the CPU 111 extracts ruled lines. Ruled lines can be extracted by using a known approach, for example, Hough transform.

In S1302, the CPU 111 then extracts the frame of a table (table frame) from the ruled line information acquired in S1301 described above and divides the frame into search regions separate from the entire image. To acquire the frame of the table, for example, combinations each formed of four ruled lines are separately assessed, the combinations that each form a quadrangle are extracted, a quadrangle having the largest area is picked up from the quadrangles that overlap with each other, and the picked-up quadrangle is used as the table frame.

In S1303, the CPU 111 then sets one of the plurality of search regions provided in S1302 described above as the search region to be processed.

In S1304, the CPU 111 then further divides the search region set as the region to be processed in S1303 described above. The search region division is the same as search region division in S403 in FIG. 4 and will therefore not be described.

In S1305, the CPU 111 then evaluates whether there is a search region that has not been processed. When there is a search region that has not been processed (Yes in S1305), the CPU 111 returns to the process in S1303.

On the other hand, when there is no search region that has not been processed (No in S1305), the CPU 111 terminates the processes in the present flowchart.

FIGS. 14A and 14B illustrate an example of the result of the search region extraction in S203 in FIG. 2 in the second embodiment.

In FIG. 14A, reference numeral 1400 represents the scanned image acquired in S201 in FIG. 2.

FIG. 14B illustrates a case where the search region extraction in S203 is performed on the scanned image 1400. In S1302 in FIG. 13, the CPU 111 extracts table frames 1401, 1402, and 1403 as the search region. Further, in S1304, the CPU 111 divides the search region 1403 into search regions 1404 and 1405.

In the first embodiment described above, 1401 and 1402 are not separate from each other as divided search regions, whereas in the second embodiment, in which the table frames formed of the ruled lines are used, 1401 and 1402 can be extracted as separate search regions. As a result, the search regions 1401 and 1402 can contain divided similar pieces of information, such as the name of a company and the telephone number of the company.

As described above, according to the second embodiment, a table frame can be used to further limit a search region when the item extraction is performed.

Third Embodiment

In the second embodiment described above, a table frame is extracted as a search region based on ruled lines of a table. However, for example, in the case of a table in which the ruled lines are partly missing or in the case of failure in the extraction of the ruled lines, a search region that should be essentially set is likely to be smaller than intended. In such a case, information on the item name groups is used to expand a search region in the third embodiment.

FIG. 15 is a flowchart illustrating an example of the details of the search region extraction in S203 in FIG. 2 in the third embodiment. The contents of the processes in S401, S402 and S1301 to S1305 are the same as the contents in the flowchart of FIG. 13 in the second embodiment and are therefore not be described. The processes in the flowchart illustrated in FIG. 15 are achieved when the CPU 111 of the information processing apparatus 110 reads and executes a program stored, for example, in one of the ROM 112 and the HDD 114.

In S1501, when the item name group acquired in S402 does not fall within the table frame acquired in S1302, the CPU 111 expands the search region in such a way that the search region contains the item name group acquired in S402.

Figures 16A, 16B:
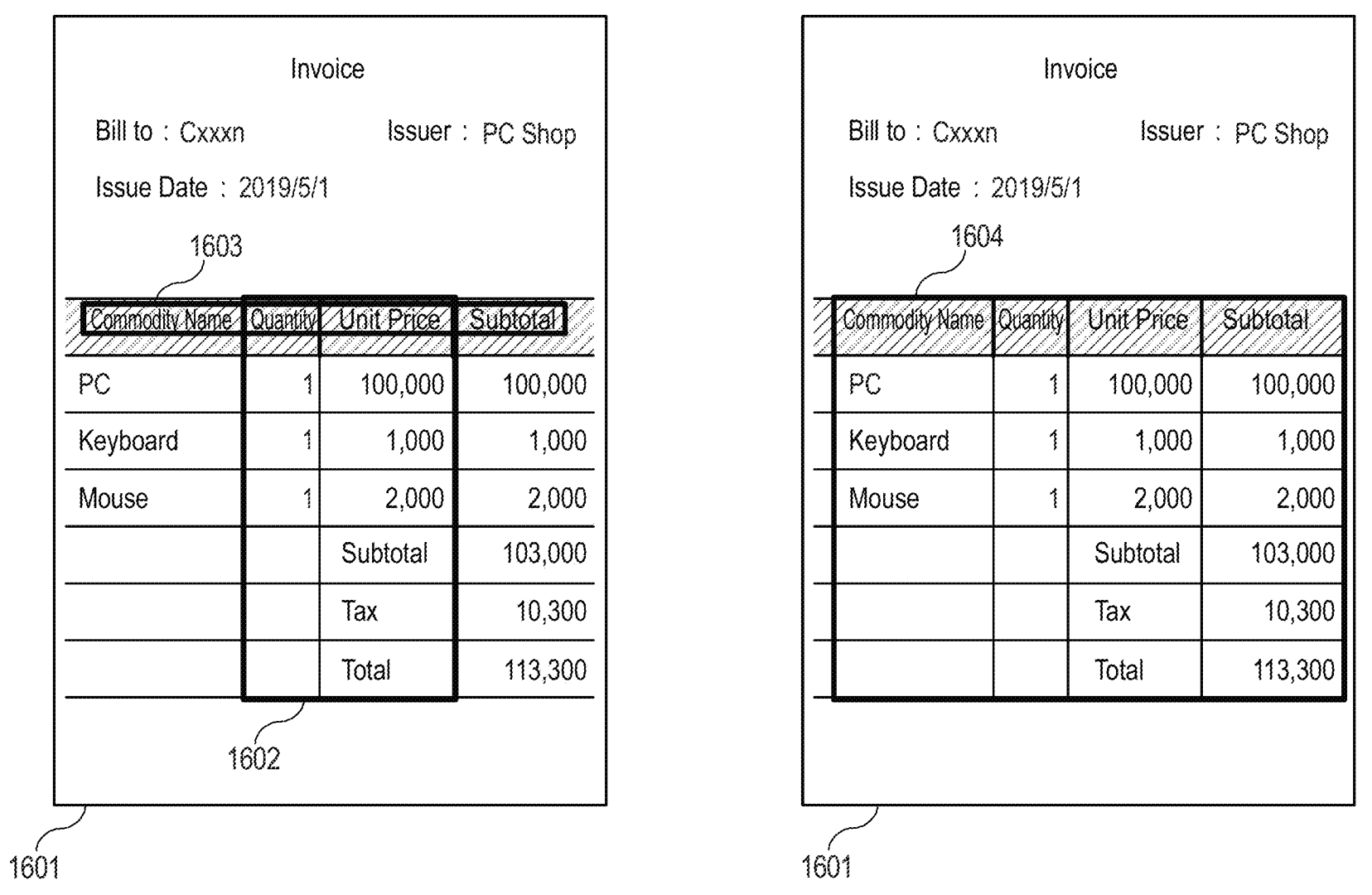

FIGS. 16A and 16B illustrate an example of the result of the search region extraction in S203 in FIG. 2 in the third embodiment.

In FIG. 16A, reference numeral 1601 represents an example of the scanned image acquired in S201 in FIG. 2.

Reference numeral 1602 represents the table frame acquired in S1302 in FIG. 15. Since the scanned image 1601 has a table but no right or left ruled line, the table frame that should be essentially extracted is narrower than intended.

Reference numeral 1603 represents an example of the item name group acquired in S402 in FIG. 15. In the example illustrated in FIG. 16A, the item name group 1603 does not fall within the table frame 1602. Therefore, to allow the item name group 1603 to fall within the table frame 1602, the CPU 111 expands the table frame 1602 into a table frame 1604 illustrated in FIG. 16B in S1501 in FIG. 15.

Reference numeral 1604 in FIG. 16B represents the search region expanded in S1501 in FIG. 15.

As described above, according to the third embodiment, a search region can be appropriately expanded by using an item name groups in such a way that the expanded search region contains a table frame. As a result, based on the positional relationship between an item name and an item value, the item value can be appropriately extracted even from a table having a complicated configuration or a table having some ruled lines omitted.

As described above, in each of the embodiments, before the item value extraction, a character string that looks like an item name and a character string that looks like an item value are evaluated in a simple manner, and a search region is divided and limited based on the arrangement of the character strings. As a result, even in the case of a document image having a complicated layout, the positional relationship between an item name and an item value allows appropriate extraction of the item value irrespective of presence or absence of a table structure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-162509, filed Sep. 6, 2019, which is hereby incorporated by reference herein in its entirety.

What is claimed is:

1. An information processing apparatus comprising:
at least one memory that stores a program; and
at least one processor that executes the program to perform:
obtaining character strings by performing an optical character recognition process on a document image;
evaluating whether each of the obtained character strings is an item name or an item value;
creating a plurality of item name groups, wherein each of the plurality of item name groups is created by grouping character strings that are determined to be the item name and continuously present in a horizontal or vertical direction in the document image;
setting a plurality of regions in the document image based on positions of the created plurality of item name groups and positions of character strings that are determined to be the item value, wherein each of the set regions includes one of the created plurality of item name groups and character strings that are determined to be the item value and adjacent to the one of the created plurality of item name groups; and
extracting the item value corresponding to the item name based on a relationship between the item name and the item value included in each of the set plurality of regions.

2. The information processing apparatus according to claim 1,
wherein the at least one processor executes the program to further perform:
extracting ruled lines from the document image;
extracting frames of tables from combinations of the extracted ruled lines;
and wherein the plurality of regions are set based on regions corresponding to the extracted frames of the tables, the positions of the created plurality of item name groups and the positions of character strings that are determined to be the item value.

3. The information processing apparatus according to claim 2, wherein in a case where one of the item name groups does not fall within the extracted frame, the region corresponding to the extracted frame is so expanded as to contain the one of the item name groups.

4. An information processing method comprising:
obtaining character strings by performing an optical character recognition process on a document image;
evaluating whether each of the obtained character strings is an item name or an item value;
creating a plurality of item name groups, wherein each of the plurality of item name groups is created by grouping character strings that are determined to be the item name and continuously present in a horizontal or vertical direction in the document image;
setting a plurality of regions in the document image based on positions of the created plurality of item name groups and positions of character strings that are determined to be the item value, wherein each of the set regions includes one of the created plurality of item name groups and character strings that are determined to be the item value and adjacent to the one of the created plurality of item name groups; and extracting the item value corresponding to the item name based on a relationship between the item name and the item value included in each of the set plurality of regions.

5. A non-transitory computer readable storage medium storing a program for causing a processor to perform:
obtaining character strings by performing an optical character recognition process on a document image;
evaluating whether each of the obtained character strings is an item name or an item value;
creating a plurality of item name groups, wherein each of the plurality of item name groups is created by grouping character strings that are determined to be the item name and continuously present in a horizontal or vertical direction in the document image;
setting a plurality of regions in the document image based on positions of the created plurality of item name groups and positions of character strings that are determined to be the item value, wherein each of the set regions includes one of the created plurality of item name groups and character strings that are determined to be the item value and adjacent to the one of the created plurality of item name groups; and
extracting the item value corresponding to the item name based on a relationship between the item name and the item value included in each of the set plurality of regions.

\* \* \* \* \*